March 24, 1931.  W. G. WILSON  1,797,490
MEANS FOR OPERATING THE SEALING ELEMENT OF GATE VALVES
Filed Sept. 27, 1928   4 Sheets-Sheet 1
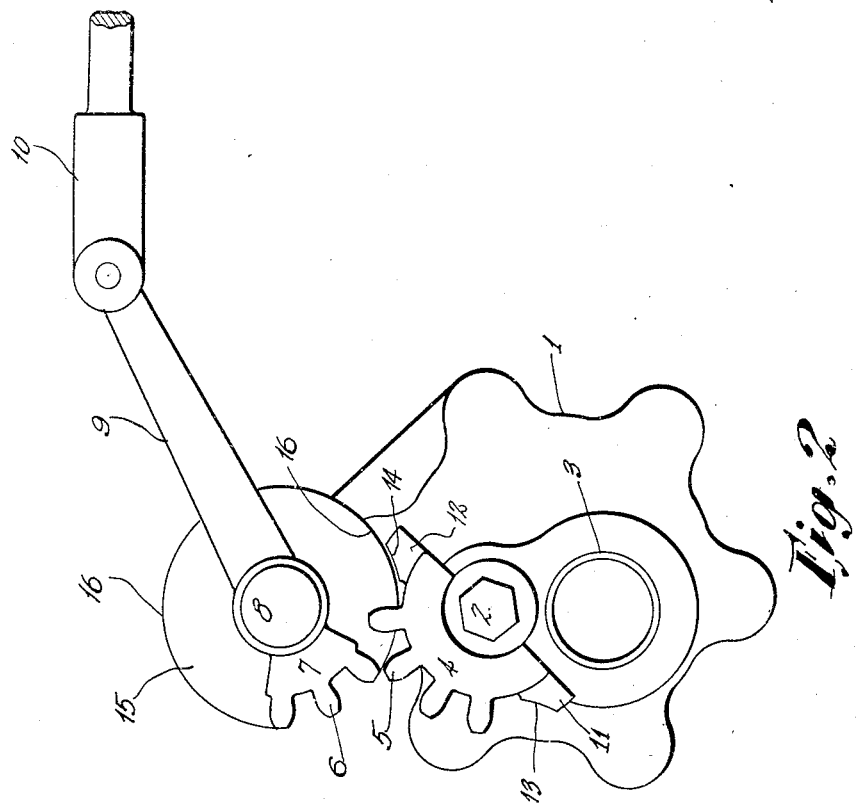
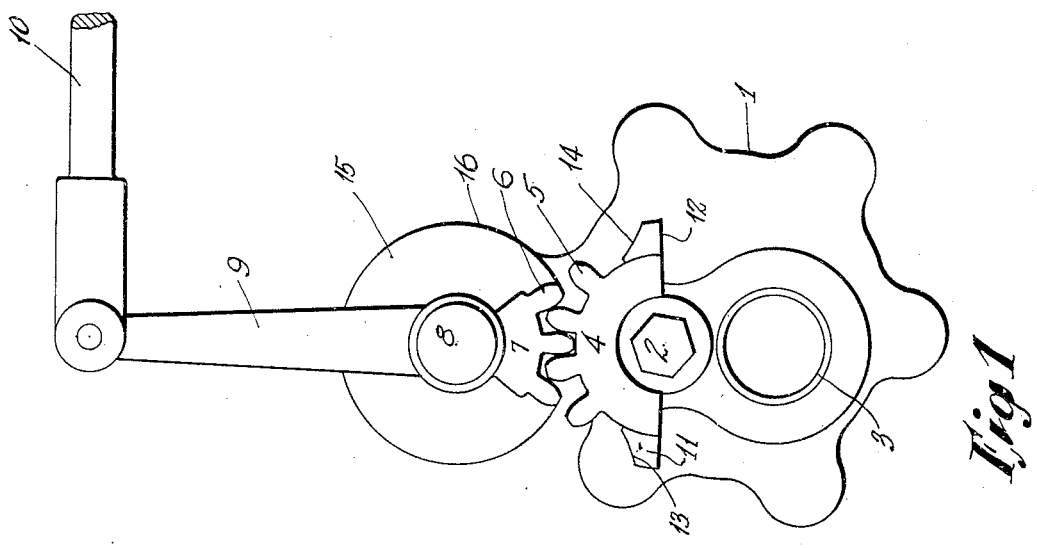
INVENTOR.
Wylie G. Wilson
BY James L. Stewart
ATTORNEYS.

March 24, 1931.   W. G. WILSON   1,797,490
MEANS FOR OPERATING THE SEALING ELEMENT OF GATE VALVES
Filed Sept. 27, 1928   4 Sheets-Sheet 2

INVENTOR.
Wylie G. Wilson
BY James L. Stewart
ATTORNEYS.

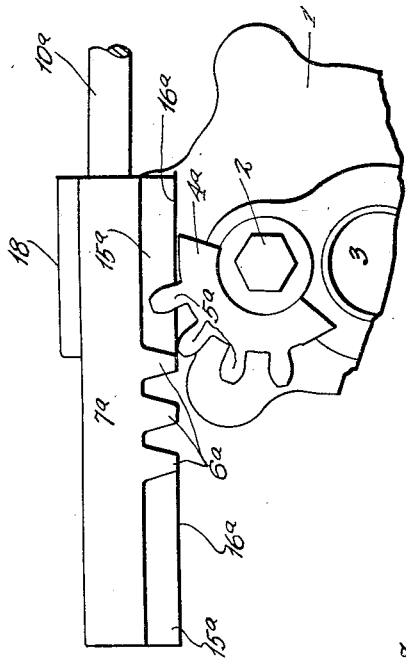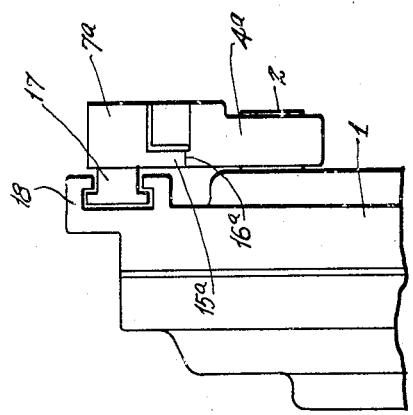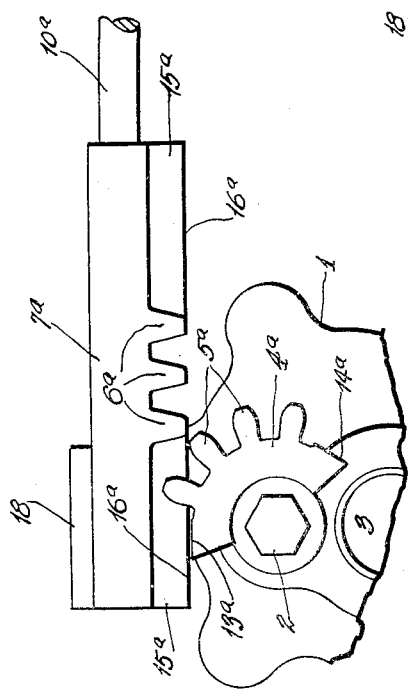

March 24, 1931.　　　W. G. WILSON　　　1,797,490
MEANS FOR OPERATING THE SEALING ELEMENT OF GATE VALVES
Filed Sept. 27, 1928　　4 Sheets-Sheet 4

INVENTOR.
Wylie G. Wilson
BY James L. Stewart
ATTORNEYS.

Patented Mar. 24, 1931

1,797,490

UNITED STATES PATENT OFFICE

WYLIE G. WILSON, OF JERSEY CITY, NEW JERSEY, ASSIGNOR TO EVERLASTING VALVE COMPANY, A CORPORATION OF NEW JERSEY

MEANS FOR OPERATING THE SEALING ELEMENT OF GATE VALVES

Application filed September 27, 1928. Serial No. 308,768.

This invention relates to apparatus wherein a power actuated driving element is utilized to transmit power to a driven element in such manner as to drive the driven element through a definite, predetermined distance in opposite directions and to positively lock the driven element at both termini of its travel while allowing of sufficient overtravel of the driving element to permit the latter to expend or dissipate the momentum of itself and associated prime mover, without shock or strain upon the mechanism such as would result from a sudden stopping of these parts.

The present invention is useful for many purposes, but is especially desirable for employment in connection with the operating mechanism of gate valves, such, for example, as disclosed in Patent No. 1,485,002, issued to me on February 26, 1924, and on which construction the present invention constitutes an improvement.

In the operation of a gate valve the sealing element of the valve is moved into and out of registration with the valve port to close or open the valve. When the valve is closed it is of utmost importance that the sealing element be moved into exact registration with the port and thereupon brought to rest in this position. If it overtravels or undertravels, it will fail to properly seal the port and if the overtravel is appreciable, its operating part may strike against the casing with sufficient force to damage the casing or such operating parts of the valve. When the valve is opened, it is necessary to move the sealing element entirely away from the port and then bring it to rest before its operating parts strike the casing. It thus follows that in the operation of a gate valve there are two very definite positions at which the movement of the sealing element should terminate. In other words, if the valve is to function properly and with full efficiency, its sealing element must operate between two well defined and predetermined termini of movement without undertravel or overtravel.

This has long been appreciated, and in order to insure the stopping of the sealing element at these points, it has been the practice to provide stops or abutments so arranged as to positively engage and arrest the operating parts of the valve when the sealing element reaches such predetermined terminal positions. Gate valves, thus constructed, have long been satisfactorily manually operated through suitable operating handles or levers, and as manual operations are fairly elastic and yielding no appreciable difficulty has been experienced. There is, however, an ever increasing demand for the operation of such valves, and particularly valves of the larger sizes, through power produced reciprocating motion derived from hydraulic cylinders, electric motors and the like.

The power operation of gate valves from power produced reciprocating motion presents various problems due to the well recognized fact that it is extremely difficult, if not practically impossible, to operate power machines, such as electric motors and hydraulic cylinders, within definite limits, with a delivery of substantially maximum power up to one of such limits as required in gate valve operation wherein the maximum power required to operate the sealing element is at the extreme end of the closing operation and during the initial movement of the opening operation. The momentum or inertia of the operating parts cannot in practice be instantly dissipated and any attempt to arrest their movement in an instantaneous manner results in shocks which are highly detrimental to the construction and which may result in serious damage.

Attempts have been made to produce power operated gate valve mechanisms by equipping such mechanisms with stops or abutments, such as are used with the manually operated valves, but experience has shown that it is practically impossible to check the movements of valve operating power mechanisms suddenly by means of stops without serious shock and the consequent eventual damage to the parts of the mechanism.

The primary object of this invention, therefore, is to eliminate the necessity of employing stops or abutments and to provide simple and efficient mechanism whereby the sealing element of a gate valve may be shifted from open to closed position and vice versa, without accompanying shocks and without overtravel or undertravel.

The problem presented consists in the operation of a driven element, e. g., the sealing element of a valve, in opposite directions through a predetermined exact distance between definite and predetermined termini of movement, with maximum resistance adjacent one of said termini, from a source of power-produced reciprocating motion of inexact resistance-overcoming travel, which usually has lessened ability to overcome resistance as it reaches opposite ends of its stroke.

This problem is solved in accordance with the present invention by utilizing only a portion of the stroke of the power-produced reciprocating motion to drive the driven element, and so associating the driving and driven elements that, during the intermediate driving portion of the stroke, said elements will be positively connected for the transmission of power while, during the end portions of the stroke, the driving element will be susceptible to idle movement in the nature of overtravel, during which the inertia or momentum of the driving element and its prime mover may be dissipated without shock to any of the mechanism.

It is of marked practical importance that the driving and driven elements are shaped to have positive driving relation during said intermediate operating portion of the stroke of the former and for the driving element to positively lock the driven element at its termini during said idle travel of the driving element and during which time the inertia of the parts is dissipated.

In one manner of practically carrying out the invention, though not the exclusive one, the post of the valve to which the sealing element is secured, and by which it is operated, may conveniently have affixed thereto a toothed sector adapted to mesh with a toothed sector to which is secured an operating arm driven from a suitable source of power such as an electric motor or hydraulic cylinder through a suitable connecting rod which imparts a rocking or reciprocating motion to the operating arm. The geared relation between the two sectors is such that the complete travel of one over the other will effect the opening or closing of the valve within exact limits, the teeth of the driving sector moving out of mesh with respect to the teeth of the driven sector when the sealing element is at each terminus of its travel, so that the sealing element may abruptly stop at such terminus while the driving sector is free to continue its movement to the end of the stroke in order to dissipate the inertia of its moving parts.

It is highly important that the interlocking relation exist between the driving and driven sectors at all times so that on the return stroke their teeth may properly mesh, and to insure of this the driven sector is provided at its opposite ends with concave portions having a radius substantially equal to cooperating convex portions correspondingly placed on the driving sector. With this arrangement one convex portion of the driving sector will engage with the corresponding concave portion of the driven sector as soon as the teeth of the two sectors move out of mesh. As a result, the driven sector is locked in stationary position at both termini of its travel while the driving sector is overtraveling as specified.

It therefore follows that these elements are at all times susceptible to power-transmitting cooperation and when the prime mover is caused to function, there will invariably result the application of force to the valve to open or close the same as the case may be, with a positive locking of the valve at the completion of each operation.

Features of the invention, other than those adverted to, will be apparent from the hereinafter detailed description and claims, when read in conjunction with the accompanying drawings.

The drawings illustrate different practical embodiments of the invention, but the constructions therein shown are to be understood as illustrative, only, and not as defining the limits of the invention.

Figure 1 is a side elevation of a valve, the operating mechanism being illustrated at substantially the middle of its stroke.

Figures 2 and 3 are views similar to Figure 1, but showing the operating mechanism at the opposite ends of the stroke.

Figures 5 and 6 are elevations showing operating means embodying a modified form of construction, these views illustrating such operating means at the opposite termini of their stroke.

Figure 7 is an edge view looking from the right of Figure 5.

Figure 3:
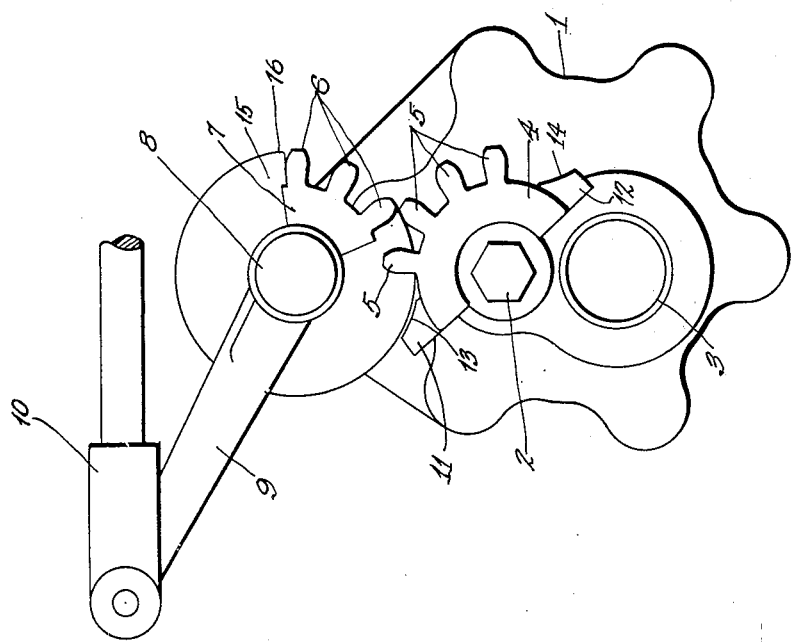

Referring to the drawings, 1 designates a valve body provided interiorly with a sealing element (not shown) and which sealing element is in practice secured to and operated by a valve shaft 2. Rotation of the shaft 2 in one direction or other serves to move the sealing element into or out of registration with the port 3 of the valve body for the purpose of closing or opening the valve as may be desired. This structure is conventional and is illustrated merely to show a practical application of the present invention, which, as hereinbefore stated, may be employed for the operation of the sealing element.

It should be borne in mind, however, that with this type of valve, it is desired to move the sealing element from an accurately placed "open" position to an accurately placed "closed" position, and vice versa. In other words, during the closing movement of the valve, the sealing element must be moved into a position to register with the port and must stop in this position while during the opening of the valve, the sealing element must be moved out of registration with the port and stopped in this position. These open and closed positions which it is desired the sealing element should occupy, may be referred to as the termini of movement of the sealing element.

Figure 4:
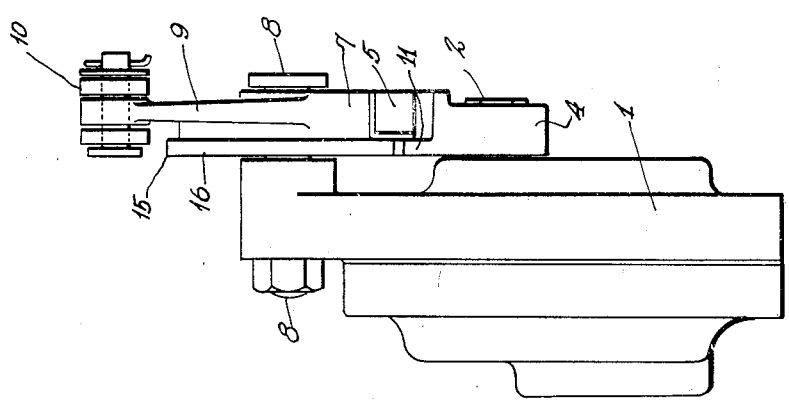
Figure 4 is an edge view of the apparatus with the parts in the position illustrated in Figure 3.
Figure 9:
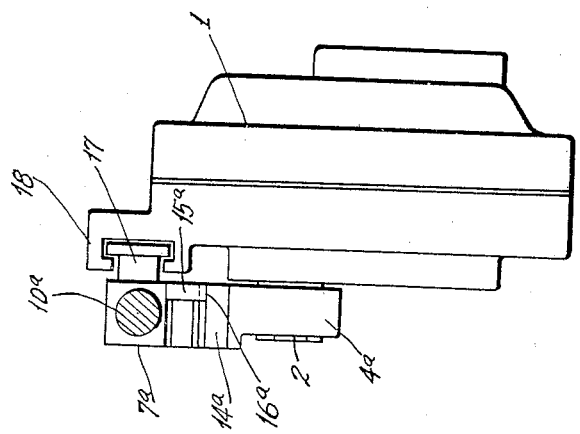
Figure 9 is a section on the line 9—9 of Figure 8.
Figure 8:
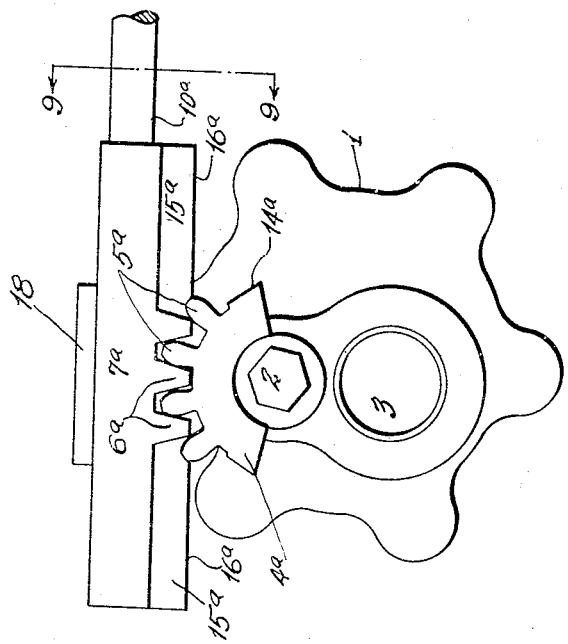
Figure 8 shows the mechanism of Figures 4 and 5 with the operating means substantially midway of its stroke.

In carrying out the present invention, as illustrated in Figures 1 to 4, inclusive, I fix upon the shaft 2 a sector 4 provided with teeth 5 which teeth are adapted to mesh with teeth 6 carried by a sector 7 mounted for oscillating movement upon a fixed stud 8 supported on the valve body as shown best in Figure 4.

Rigid with the sector 7 is an operating arm 9 to the free end of which is secured a connecting rod 10 to which reciprocating movement is imparted from any suitable prime mover such as a hydraulic cylinder, electric motor or the like. Through the operations of such power prime mover, reciprocation is imparted to the connecting rod 10 with the result that the operating arm 9 is reciprocated or oscillated about the stud 8 and in so doing serves to oscillate the sector 7 and the cooperating sector 4, while the teeth 6 and 5 of the respective sectors are in mesh with one another.

In practically carrying out the present invention, it is found desirable to employ a prime mover, the throw or stroke of which is of greater amplitude than is required to move the sector 4 through the arc necessary to bring about the movement of the sealing element between its respective termini and the teeth of the two sectors are therefore of such number and size as to engage with one another only during that portion of the stroke of the prime mover as is necessary to effect the movement of the sealing element from open to closed position and vice versa. It therefore follows that as the operating arm is moved from one end of its stroke to the other, the teeth 5 and 6 will only mesh during an intermediate portion of the stroke, there being portions of the stroke at its beginning and at its end during which the teeth 6 pass out of mesh with respect to the teeth 5. While it is desirable that this be the case, it is also essential that some means be provided for interlocking the sectors while the teeth are out of mesh so that when the time comes for them to re-engage, they will be in such relative positions as to cooperate.

In order to accomplish this result, the opposite ends of the sector 4 are provided with flanges 11 and 12 having curved faces 13 and 14, while the sector 7 is provided with a flange 15 having a curved or circular periphery 16, the radius of which is equal to the radius of the sector 7. The surfaces 13 and 14 of the flanges 11 and 12 are also curved on substantially the same radius, and, accordingly, these surfaces are adapted to cooperate with the surface 16 as the teeth 6 pass out of mesh with respect to the teeth 5, whereby sector 4 is locked in its terminal positions while the operating arm is susceptible to overtravel to the full extent of the throw of the connecting rod 10. These operations will be clearly apparent from an inspection of Figures 1, 2 and 3.

In Figure 2, the connecting rod is shown at one end of its stroke. In this position, the curved surface 14 is locked by the curved surface 16, and the teeth 6 are out of mesh with the teeth 5. The sealing element is in this position at one of its termini. Now if the connecting rod 10 moves to the left in Figure 2, there will be a period at the beginning of the stroke during which the sector 7 will have idle travel, at the conclusion of which the teeth 6 will engage with the teeth 5 and the sector 4 will thereupon be driven to and past the central position of Figure 1 and into a position wherein the sealing element will have reached the other terminus of its travel. The teeth 6 will thereupon immediately disengage the teeth 5 and the curved surface 16 will coact with the curved surface 13 until the connecting rod has reached the end of its stroke as shown in Figure 3.

It therefore follows that the sector 7 which constitutes the driving element of the structure will positively mesh and drive the driven element 4 during an intermediate portion of the stroke of the former while leaving the elements interlocked when the teeth disengage to insure accurate reengagement of the teeth upon the return stroke. The meshing of the teeth 6 and 5 takes place only during the intermediate portion of the stroke during which the operating arm 9 is operated smoothly and with the greater portion of its power and the teeth are disengaged during the terminal portions of the stroke at which times it is least capable of applying power and most apt to produce shocks due to sudden stopping or starting of the operating parts.

It is to be noted that with this arrangement a prime mover may be employed with a relatively indeterminate travel, for only an intermediate portion of the travel is utilized. During the beginning of the stroke, it operates idly to accelerate smoothly and at the end of the stroke to dissipate its inertia and change direction. Manifestly, these operations occur irrespective of the direction of movement of the connecting rod, and, accordingly, the valve may be both opened and closed with equal facility.

Moreover, the arrangement is such that the operation of the valve is absolutely reliable and the inability to commence or stop the operation of the prime mover in exact positions is of no moment. The present invention provides for considerable flexibility in the stopping and starting of the prime mover, the arrangement being such that the parts are always in cooperative interlocked relation to render the sealing element of the valve responsive to the operations of the prime mover during the intermediate portion of the stroke of the operating arm 9 as hereinbefore stated.

In the construction which I have specifically described, the driving and driven elements are in the form of sectors. I wish it understood, however, that these connections may vary without departing from the spirit of this invention, and while it is not feasible to show all the different driving connections that might be employed, I have illustrated in Figures 5 to 9 another embodiment of the present invention. In these latter figures, the valve shaft 2 is provided with a sector 4a corresponding to the sector 4, and provided at its opposite ends with flanges having flat faces 13a and 14a, which correspond in their functions to the curved faces 13 and 14. The driving element, instead of being in the form of a sector 7 embodies a rack 7a having teeth 6a adapted to mesh with the teeth 5a. The rack is mounted for reciprocating movement adapted to be imparted thereto by a connecting rod 10a and is provided with flanges 15a having flat faces 16a corresponding in their functions to the curved face 16. The rack is provided at its back with a slide 17 mounted for sliding movement within a guide 18 formed on the valve body.

The structure of Figures 5 to 9 functions in exactly the same manner as the structure of the preceding figures except that in the modified form of the invention, the rack 7a has a rectilinear motion, while in Figures 1 to 4, the sector 7 has an oscillatory motion.

In the foregoing detailed description of the invention, the underlying principle will be apparent. There is in both cases the operation of a driven element from a power operated driving element and which elements are in direct and positive cooperation at all times so that movement or non-movement of the driven element is always and absolutely controlled by the driving element.

The forms of the invention which I have chosen to describe are illustrative, and the invention is to be understood as fully commensurate with the appended claims.

Having thus fully described the invention, what I claim as new and desire to secure by Letters Patent is:

1. In a power driven gate valve, a valve seat having a port, a sealing member adapted to cooperate with said seat, and means to move said sealing member into and out of registration with said port, and to stop the same in exact predetermined positions without undertravel or overtravel, comprising a power operated driving element movable in opposite directions, which movement is of greater amplitude than is required to operate the sealing member, a driven element secured to the sealing member to operate the latter, means for positively connecting the driving and driven elements during an intermediate portion of the travel of the driving element in each direction, and to release the driven element when the sealing member reaches either of said predetermined positions, and complementary locking portions movable with the respective elements and shaped to slidably engage with one another when the sealing member reaches either of said predetermined positions to lock said driven element against further movement, while the driving element completes its movement in the corresponding directions, and to maintain such driven element in position to register with and be re-engaged by the positively connecting means of the driving element for the intermediate operating portion of the return movement of the latter.

2. In a power driven gate valve, a valve seat having a port, a sealing member adapted to cooperate with said seat, and means to move said sealing member into and out of registration with said port and to stop the same in exact predetermined positions without undertravel or overtravel, comprising a power operated driving element movable in opposite directions, which movement is of greater amplitude than is required to operate the sealing member, a driven element secured to the sealing member to operate the latter, teeth on both of said elements positioned to mesh during an intermediate portion of the travel of the driving element in each direction to operate the driven element while the teeth are in mesh, and to disengage when the sealing member has reached either of said predetermined positions to permit continued travel of the driving element in the same direction, and complementary relatively slidable locking surfaces movable with the respective elements to slidably engage with one another when the teeth are disengaged in either direction to maintain and lock the teeth of the driven element in position to register with and be re-engaged by the teeth of the driving element during the respective return movement of the latter.

3. In a power driven gate valve, a valve seat having a port, a sealing member adapted to cooperate with said seat, and means to move said sealing member into and out of registration with said port and to stop the same in exact predetermined positions without undertravel or overtravel, driving and driven mutilated toothed elements, the driving element of which is power operated and is movable in opposite directions, which movement is of greater amplitude than is required to operate the sealing member, and the driven element of which is secured to the sealing member, the teeth on said elements being so disposed that they will mesh only during the intermediate portion of the travel of the driven element necessary to drive the sealing member from one of its predetermined positions to the other, and vice versa, and smooth locking surfaces movable with said elements and positioned to slidably engage with one another when the teeth disengage, and vice versa, to lock the sealing member in each of said positions while the teeth are disengaged and to insure accurate registration and re-engagement of the teeth.

Signed by me at Jersey City, N. J., this 21st day of September, 1928.

WYLIE G. WILSON.